Figure 1:
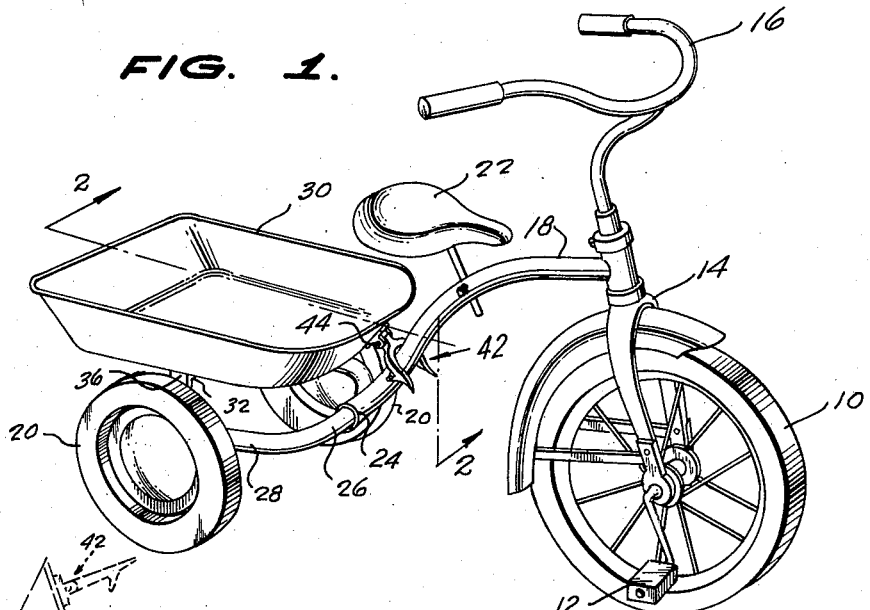

Oct. 13, 1964  E. E. MOREHEAD  3,152,838

DUMPING TRICYCLE

Filed April 12, 1963

INVENTOR.
ENNIS E. MOREHEAD,

BY

*McMorrow, Berman & Davidson*
ATTORNEYS.

3,152,838
DUMPING TRICYCLE
Ennis E. Morehead, Pasadena, Tex. (16302 Market St. Road, P.O. Box 340, Channelview, Tex.)
Filed Apr. 12, 1963, Ser. No. 272,564
9 Claims. (Cl. 298—17)

This invention relates to toy vehicles in general, and in particular to a load-carrying vehicle.

A general object of the invention is to provide a toy vehicle supporting a load-carrying box or body, capable of bodily swinging movement, for dumping.

More particularly, it is an object to provide a swingable, dump box on a tricycle, and a further object is to provide a dump box which is easily attached to a vehicle, and easily removed therefrom.

In still greater particular, it is an object to provide a tricycle with rear wheels mounted on stub shafts, and a dump box holding a forked, swing mount, with spring characteristics, and adapted to be snapped onto the stub shafts.

Yet another object is to provide a novel automatic catch, or detent, to hold the dump box in load-holding position.

The objects also include the provision of a device which is simple in structure, low in cost, and easy of manufacture and maintenance, yet rugged and reliable in service.

Figure 2:
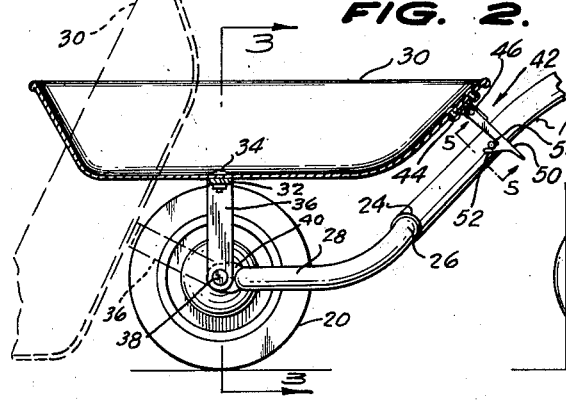
Figure 3:
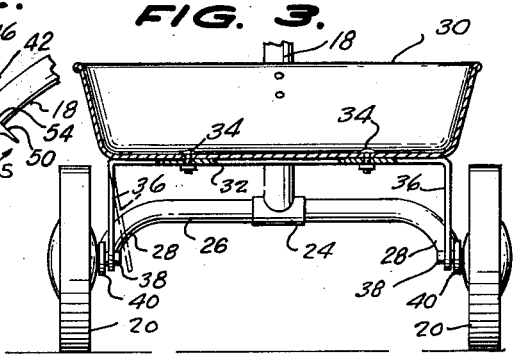
Figure 4:
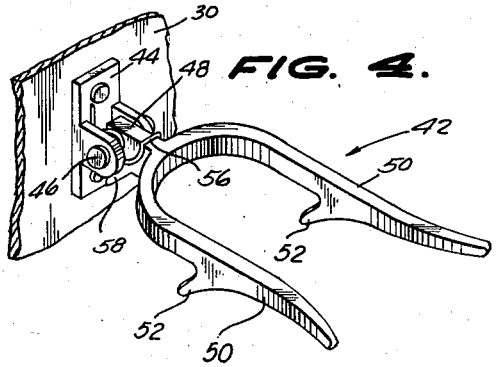
Figure 5:
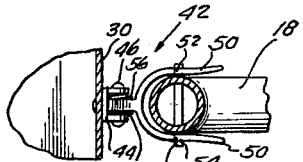

These and other objects, which will be apparent, are attained by the present invention, a preferred form of which is described in the following specification, as illustrated in the drawing, in which:

FIGURE 1 is a perspective view of a tricycle having a dump box, according to the invention, FIGURE 2 is a longitudinal sectional view through the dump box, taken on the plane of the line 2—2 of FIGURE 1, enlarged in scale thereover, and showing the dumping position of the box in broken lines, FIGURE 3 is another sectional view through the dump box, transversely thereof, taken on the plane of the line 3—3 of FIGURE 2, FIGURE 4 is a perspective view of a detail, showing the dump box holding latch, enlarged over the scale of FIGURE 2, and FIGURE 5 is a sectional view, showing details of the latch, taken on the plane of the line 5—5 of FIGURE 2, and enlarged in scale thereover.

Referring to the drawing by characters of reference, there is shown a tricycle having a front wheel 10, pedals 12, front fork 14, handlebars 16, main frame 18, rear wheels 20, and seat 22, all of which may be considered as conventional except for the rearward portion of frame 18, in which the fork mounting the rear wheels is more nearly in a horizontal position than the conventional, downwardly-depending, rear forks. The cross sleeve 24 on the rearward, terminal end of frame 18 may also be considered as conventional, and the same is true, in a general sense, as to the U-form fork member 26, the bight portion of which is received in sleeve 24, and secured as by welding. However, the parts are so arranged that leg portions 28 of fork member 26 lie substantially in or near a vertical plane, whereas conventional rear forks will seldom be found closer to the horizontal than about a 45° angle. As clearly seen in FIGURE 2, this gives adequate clearance for the load-carrying box 30, thus avoiding undesirable outboard location thereof, placing the center of gravity of the load substantially over the axis of the rear wheels, and rendering the vehicle system compact, to a highly satisfactory degree.

For swing mounting of the box 30, there is attached to the underside thereof, medially of its length, and extending transversely, a generally U-form bracket 32, of flat stock of appreciable width, secured as by bolts 34, spanning the width of the box, and having a pair of parallel, depending legs 36, at its ends, with axially-aligned bores near their lower ends, for the swing mounting.

In lieu of the usual, single axle, rear wheels 20 are each mounted on a stub shaft 38, secured to the flattened, rear ends 40 of fork legs 28, and extending inwardly thereof. As seen by the dotted line showing of one of the swing legs 36, in FIGURE 3, the legs are capable of being sprung inwardly, to be slipped onto stub shafts 38. Removal is also easily accomplished by the same springing action. In these actions, either one or both legs may be sprung.

Preferably, the sides of dished box or body 30 are slanted, for general compactness, and, in the case of the rear end, to facilitate dumping. Forwardly of the box, the slant wall comports with the general slant of frame 18, and the latch member indicated as a whole by the numeral 42, is carried by this slanted front wall, for latching to frame 18 in the horizontal, load-carrying position of the box, shown in full lines in FIGURE 2. Thus, the said front wall of the box carries a forked bracket 44, with a transverse pivot pin 46, on which is pivoted the outwardly-extending tongue 48, located at the mid-point of the bight portion of a forked-shaped latch with legs 50. The outer ends of legs 50 of the latch are adapted to straddle the frame tube 18, in latching position, and to this end the outer ends of the legs are curvate, in a diverging sense, to facilitate negotiating the frame. Rearwardly-extending hook elements 52, depending from legs 50, are adapted to engage the ends of a transverse detent pin 54, carried by frame 18, the form of hook elements being such that they are cammed upwardly in passing over the pin, and fall into locking position after over-ridding the pin. The latch is biased downwardly in this locking position by a continuously acting torsion spring 56, surrounding pivot pin 46, and acting between bracket 44 and tongue 48 of the latch. For limiting downward, swinging movement of the latch the tongue 48 has a lower extension 58 which comes into abutment with bracket 44.

From the foregoing description, it will be seen that the objects mentioned above are attained in satisfactory measure. Assuming the body 30 in the position of adjustment shown in FIGURES 1 and 2, and carrying a load of loose material, dumping is initiated by manual release of latch 42, by lifting thereof against the bias of spring 56. Whether or not the body 30 tilts rearwardly, automatically, to the position shown in broken lines in FIGURE 2, or requires a degree of lift, manually applied, will depend upon the location of the center of gravity of the loaded body with respect to the axis of swing of legs 36 (which also happens to be the axis of rotation of the rear wheels). In lieu of direct manual lifting of the latch, an operating cable, therefore, may be strung in suitable guides on the frame and handlebars, with control convenient to the hand of the operator. After dumping, the body is swung back to the full-line position shown in FIGURE 2, in which action the latch 42 automatically engages the pin 54, and the body is ready for reloading.

If use of the body 30 is not desired, it is quite easily removed, while in either position shown in FIGURE 2, by springing one or both of the legs inwardly to slip the legs over the inner ends of the stub shafts. Remounting of the body is as easily accomplished by springing the legs to slip over the stub shafts.

While a certain, preferred embodiment has been shown and described, various modifications will be apparent, in the light of this disclosure, and the invention should not, therefore, be deemed as limited, except insofar as shall appear from the spirit and scope of the appended claims.

What is claimed is:

1. In combination, a tricycle comprising a frame having a slanting, intermediate portion, and a rear, forked portion carried by said slanting portion, and disposed in a substantially horizontal plane, a pair of axially-aligned stub shafts carried by the outer ends of the tines of said forked portion, and each extending on both sides of a tine, a pair of rear wheels carried by the outer ends of said shafts, and a dished, load-carrying body swingably mounted on said shafts, and comprising a transversely-disposed, generally U-form bracket, of strap stock, with parallel, depending legs at each end, having axially-aligned bores, said bores adapted to be received on the inner ends of said shafts, and said legs having a resilience enabling inward springing thereof, to clear the ends of said shafts for mounting and demounting, and latch means carried on the forward end of said body and adapted to engage said slanting portion of said frame.

2. A device as in claim 1, said latch means comprising a forked element, with its bight portion pivoted on said body, and with its tines adapted to straddle said frame, means on said bight portion limiting swing of said element, a detent on said frame, and hook elements on said tines adapted to engage said detent, and spring means biasing said latch to locking position of swing.

3. A device as in claim 1, said latch means comprising a forked element, with its bight portion pivoted on said body, and with its tines adapted to straddle said frame, means on said bight portion limiting swing of said element, a detent on said frame, and hook elements on said tines adapted to engage said detent.

4. A device as in claim 1, said latch means comprising a forked element, with its bight portion pivoted on said body, and with its tines adapted to straddle said frame, a detent on said frame, and hook elements on said tines adapted to engage said detent.

5. A device as in claim 1, said latch means comprising a forked element, pivoted on said body, and with its tines adapted to straddle said frame, a detent on said frame, and hook elements on said tines adapted to engage said detent.

6. In combination, a tricycle comprising a frame having a slanting, intermediate portion, and a rear, forked portion carried by said slanting portion, and disposed in a substantially horizontal plane, a pair of axially-aligned stub shafts carried by the outer ends of the tines of said forked portion, and each extending on both sides of a tine, a pair of rear wheels carried by the outer ends of said shafts, and a dished, load-carrying body swingably mounted on said shafts, and comprising a transversely-disposed, generally U-form bracket, with parallel, depending legs at each end, having axially-aligned bores, said bores adapted to be received on the inner ends of said shafts, and said legs having a resilience enabling inward springing thereof, to clear the ends of said shafts for mounting and demounting, and latch means carried on the forward end of said body and adapted to engage said frame.

7. In combination, a tricycle comprising a frame having a rear, forked portion disposed in a substantially horizontal plane, a pair of axially-aligned stub shafts carried by the outer ends of the tines of said forked portion, and each extending on both sides of a tine, a pair of rear wheels carried by the outer ends of said shafts, and a dished, load-carrying body swingably mounted on said shafts, and comprising a transversely-disposed, generally U-form bracket, with parallel, depending legs at each end, having axially-aligned bores, said bores adapted to be received on the inner ends of said shafts, and said legs having a resilience enabling inward springing thereof, to clear the ends of said shafts for mounting and demounting, and latch means carried on the forward end of said body and adapted to engage said frame.

8. In combination, a tricycle comprising a frame having a rear, forked portion disposed in a substantially horizontal plane, a pair of axially-aligned stub shafts carried by the outer ends of the tines of said forked portion, and each extending on both sides of a tine, a pair of rear wheels carried by the outer ends of said shafts, and a load-carrying body swingably mounted on said shafts, and comprising a forked bracket, with parallel, depending legs at each end, having axially-aligned bores, said bores adapted to be received on the inner ends of said shafts, and said legs having a resilience enabling inward springing thereof, to clear the ends of said shafts for mounting and demounting, and latch means carried on the forward end of said body and adapted to engage said frame.

9. In combination, a tricycle comprising a frame having a rear, forked portion disposed in a substantially horizontal plane, a pair of axially-aligned stub shafts carried by the outer ends of the tines of said forked portion, and each extending on both sides of a tine, a pair of rear wheels carried by the outer ends of said shafts, and a load-carrying body swingably mounted on said shafts, and comprising a forked bracket with depending legs at each end, having axially-aligned bores, said bores adapted to be received on the inner ends of said shafts, and said legs having a resilience enabling inward springing thereof, to clear the ends of said shafts for mounting and demountnig, and latch means carried by said body and adapted to engage said frame.

References Cited in the file of this patent

UNITED STATES PATENTS

| | | |
|---|---|---|
| 297,238 | Dopp et al. | Apr. 22, 1884 |
| 898,204 | Feller | Sept. 8, 1908 |
| 1,838,224 | Holloway | Dec. 29, 1931 |
| 1,933,955 | Arnold | Nov. 7, 1933 |
| 2,568,374 | Thomas | Sept. 18, 1951 |
| 2,579,077 | Hubner | Dec. 18, 1951 |
| 2,766,063 | Greeley | Oct. 9, 1956 |
| 3,062,559 | Hewitt | Nov. 6, 1962 |